US012741429B2

(12) United States Patent
Ellis et al.

(10) Patent No.: US 12,741,429 B2
(45) Date of Patent: Sep. 22, 2026

(54) SYSTEM FOR JOINING DISSIMILAR MATERIALS

(71) Applicant: Edison Welding Institute, Inc., Columbus, OH (US)

(72) Inventors: Jeffrey L. Ellis, Columbus, OH (US); Miranda B. Marcus, Columbus, OH (US); Jeffrey J. Boyce, Columbus, OH (US); Matthew A Nitsch, Columbus, OH (US)

( * ) Notice: Subject to any disclaimer, the term of this patent is extended or adjusted under 35 U.S.C. 154(b) by 14 days.

(21) Appl. No.: 18/664,881

(22) Filed: May 15, 2024

(65) Prior Publication Data

US 2025/0353259 A1 Nov. 20, 2025

(51) Int. Cl.
*B29C 65/00* (2006.01)
*B29C 65/38* (2006.01)

(52) U.S. Cl.
CPC .......... *B29C 66/0246* (2013.01); *B29C 65/38* (2013.01); *B29C 66/742* (2013.01); *B29C 66/91221* (2013.01)

(58) Field of Classification Search
CPC ... B29C 66/0246; B29C 65/38; B29C 66/742; B29C 66/91221
See application file for complete search history.

(56) References Cited

U.S. PATENT DOCUMENTS

2002/0182241 A1 12/2002 Borenstein et al.
2006/0000812 A1 * 1/2006 Weber .................... B29C 66/43 156/359
2012/0052415 A1 3/2012 Fragala et al.
2014/0151733 A1 6/2014 Koike et al.
2015/0034595 A1 2/2015 Utsumi et al.
2016/0050750 A1 2/2016 Huang et al.
(Continued)

FOREIGN PATENT DOCUMENTS

EP 0495655 A1 * 7/1992 ......... B29C 65/3492
WO WO-2023095869 A1 * 6/2023 ............ B32B 27/08

OTHER PUBLICATIONS

International Search Report and Written Opinion of the International Searching Authority received in International Patent Application No. PCT/US2025/020895; mailed May 20, 2025; 13 pages.

*Primary Examiner* — George R Koch

(57) ABSTRACT

A method for joining dissimilar materials, comprising etching a micropattern into a surface of a first material that is a metal used for creating a part, wherein the micropattern includes various microfeatures; characterizing the physical characteristics of the microfeatures; characterizing a second material that is a polymer used for creating a part, wherein the characterization includes measuring a degradation temperature of the polymer and measuring a melting point/critical flow temperature of the polymer; placing the polymer on the microfeatures formed on the metal surface to form an interface between the polymer and the metal; applying compressive force to the polymer-metal combination; heating the interface to a temperature falling between the degradation temperature of the polymer and the melting point/critical flow temperature of the polymer; discontinuing heating the interface; and continuing to apply compressive force to the polymer-metal combination until the interface between the polymer and the metal has solidified.

20 Claims, 11 Drawing Sheets

(56) References Cited

U.S. PATENT DOCUMENTS

2018/0050496 A1* 2/2018 Racineux ............ B29C 66/1122
2020/0262173 A1* 8/2020 Jung ................... B29C 65/8215
2023/0191543 A1 6/2023 Feied et al.
2024/0208164 A1* 6/2024 Samant ............. B29C 66/91931
2025/0033341 A1* 1/2025 Yamaguchi ........... B32B 37/065

* cited by examiner

SYSTEM FOR JOINING DISSIMILAR MATERIALS

BACKGROUND

The disclosed technology relates in general to systems, methods, and devices for joining dissimilar materials to one another for creating components, parts, and other manufactured items, and more specifically to a system and method for bonding or joining thermoplastic or thermoset polymers to metals and other materials without the use of traditional adhesives or fasteners.

The manufacturing of components, parts, and other items for use in automotive, consumer products, medical, commercial building, government, and aerospace applications often involves or requires joining various polymers to metals or other materials. Known technologies for joining these dissimilar materials typically require the use of adhesives and fasteners. However, eliminating such adhesives and fasteners can increase manufacturing throughput, decrease overall manufacturing costs, and can result in smaller and lighter manufactured products. Accordingly, a system and method for joining thermoplastic or thermoset polymers to metals or other materials without the use of traditional adhesives or fasteners would be advantageous for economic and practical reasons.

SUMMARY

The following provides a summary of certain example implementations of the disclosed technology. This summary is not an extensive overview and is not intended to identify key or critical aspects or elements of the disclosed technology or to delineate its scope. However, it is to be understood that the use of indefinite articles in the language used to describe and claim the disclosed technology is not intended in any way to limit the described technology. Rather the use of "a" or "an" should be interpreted to mean "at least one" or "one or more".

One embodiment of the disclosed technology provides a first method for joining dissimilar materials, comprising etching a predetermined micropattern into a surface of a first material, wherein the material is a metal used for creating a part, and wherein the micropattern includes various microfeatures; characterizing the physical properties of the microfeatures; characterizing a second material, wherein the second material is a solid polymer used for creating a part, and wherein the characterization includes measuring a degradation temperature of the polymer; and measuring a melting point/critical flow temperature of the polymer; and placing the polymer on the microfeatures formed on the metal surface to form an interface between the polymer and the metal; applying a predetermined amount of compressive force to the polymer-metal combination; for a predetermined period of time, heating the interface to a temperature falling between the degradation temperature of the polymer and the melting point/critical flow temperature of the polymer; discontinuing heating the interface; and continuing to apply compressive force to the polymer-metal combination until the interface between the polymer and the metal has solidified and the materials have been joined.

Embodiments of the method further comprise using a 100 W 1064 nm wavelength pulsed fiber laser to etch the predetermined micropattern into the surface of the first material. In certain implementations, the predetermined micropattern includes a crosshatch pattern, a herringbone pattern, a pattern of squares, a pattern of concentric squares, a pattern of circles, or a pattern of concentric circles. In certain implementations, the predetermined micropattern includes parallel lines oriented perpendicular to any pressure gradient present in the part for achieving a hermetic seal between the metal and the polymer. Embodiments of the method further comprise using thermogravimetric analysis to measure the degradation temperature of the polymer. Embodiments of the method further comprise using differential scanning calorimetry to measure the melting point/critical flow temperature of the polymer. Embodiments of the method further comprise using infrared heating to heat the interface between the polymer and the metal. Embodiments of the method further comprise using transmission laser heating to heat the interface between the polymer and the metal. Embodiments of the method using either direct laser heating or transmission laser heating further include shining a 1 μm wavelength continuous laser through the polymer to heat the metal surface at the interface between the polymer and the metal. Embodiments of the method further comprise using an induction coil to heat the interface between the polymer and the metal; or using direct thermal conduction; or using resistive, spin, vibration, or ultrasonic heating. The method may further comprise substituting a different material for the first material, wherein the substituted material has a melting point that is higher than the melting point of the second material. The different material may be a ceramic or a thermoset polymer.

Another embodiment of the disclosed technology provides a second method for joining dissimilar materials, comprising laser etching a predetermined micropattern into a surface of a first material, wherein the material is a metal used for creating a part, and wherein the micropattern includes various microfeatures; characterizing the physical properties of the microfeatures; characterizing a second material, wherein the second material is a solid polymer used for creating a part, and wherein the characterization includes measuring a degradation temperature of the polymer; and measuring a melting point/critical flow temperature of the polymer; and placing the polymer on the microfeatures formed on the metal surface to form an interface between the polymer and the metal; applying a predetermined amount of compressive force to the polymer-metal combination; for a predetermined period of time, heating the interface to a temperature falling between the degradation temperature of the polymer and the melting point/critical flow temperature of the polymer; discontinuing heating the interface; continuing to apply compressive force to the polymer-metal combination until the interface between the polymer and the metal has solidified and the materials have been joined; and discontinuing application of the compressive force.

Embodiments of the method further comprise using a 100 W 1064 nm pulsed fiber laser to etch the predetermined micropattern into the surface of the first material. In certain implementations, the predetermined micropattern includes either a crosshatch pattern, a herringbone pattern, a pattern of squares, a pattern of concentric squares, a pattern of circles, or a pattern of concentric circles; or parallel lines oriented perpendicular to any pressure gradient present in the part for achieving a hermetic seal between the metal and the polymer. Embodiments of the method further comprise using thermogravimetric analysis to measure the degradation temperature of the polymer. Embodiments of the method further comprise using differential scanning calorimetry to measure the melting point/critical flow temperature of the polymer. Embodiments of the method further comprise using either infrared heating or an induction coil to heat the interface between the polymer and the metal; or using direct thermal conduction; or using resistive, spin, vibration, or ultrasonic heating. Embodiments of the method further comprise using either direct laser heating or transmission laser heating to heat the interface between the polymer and the metal. Embodiments of the method using transmission laser heating further include shining a 1 μm wavelength continuous laser through the polymer to heat the metal surface at the interface between the polymer and the metal. Embodiments of the method further comprise using an induction coil to heat the interface between the polymer and the metal. The method may further comprise substituting a different material for the first material, wherein the substituted material has a melting point that is higher than the melting point of the second material. The different material may be a ceramic or a thermoset polymer.

Still another embodiment of the disclosed technology provides a third method for joining dissimilar materials, comprising laser etching a predetermined micropattern into a surface of a first material, wherein the material is a metal used for creating a part, and wherein the micropattern includes various microfeatures; characterizing the physical properties of the microfeatures; characterizing a second material, wherein the second material is a solid polymer used for creating a part, and wherein the characterization includes measuring a degradation temperature of the polymer using thermogravimetric analysis; and measuring a melting point/critical flow temperature of the polymer using differential scanning calorimetry; placing the polymer on the microfeatures formed on the metal surface to form an interface between the polymer and the metal; applying a predetermined amount of compressive force to the polymer-metal combination; for a predetermined period of time, heating the interface to a temperature falling between the degradation temperature of the polymer and the melting point/critical flow temperature of the polymer; discontinuing heating the interface; continuing to apply compressive force to the polymer-metal combination until the interface between the polymer and the metal has solidified and the materials have been joined; and discontinuing application of the compressive force.

In certain implementations, the predetermined micropattern includes either a crosshatch pattern, a herringbone pattern, a pattern of squares, a pattern of concentric squares, a pattern of circles, or a pattern of concentric circles; or parallel lines oriented perpendicular to any pressure gradient present in the part for achieving a hermetic seal between the metal and the polymer. Embodiments of the method further comprise using either infrared heating, an induction coil, direct laser heating, or transmission laser heating to heat the interface between the polymer and the metal; or using direct thermal conduction; or using resistive, spin, vibration, or ultrasonic heating. The method may further comprise substituting a different material for the first material, wherein the substituted material has a melting point that is higher than the melting point of the second material. The different material may be a ceramic or a thermoset polymer.

Still another embodiment of the disclosed technology provides a fourth method for joining dissimilar materials, comprising etching a predetermined micropattern into a surface of a first material, wherein the material is a metal used for creating a part, and wherein the micropattern includes various microfeatures; characterizing the physical properties of the microfeatures; characterizing a second material, wherein the second material includes an uncured thermoset polymer or viscous thermoplastic polymer used for creating a part, and wherein the characterization includes measuring a degradation temperature of the polymer; and measuring a curing temperature of the polymer; flowing the polymer into the microfeatures; and applying gravitational or compressive force to the polymer-metal combination until the interface between the polymer and the metal has solidified and the materials have been joined. In certain implementations, the predetermined micropattern includes either a crosshatch pattern, a herringbone pattern, a pattern of squares, a pattern of concentric squares, a pattern of circles, or a pattern of concentric circles; or parallel lines oriented perpendicular to any pressure gradient present in the part for achieving a hermetic seal between the metal and the polymer.

It should be appreciated that all combinations of the foregoing concepts and additional concepts discussed in greater detail below (provided such concepts are not mutually inconsistent) are contemplated as being part of the technology disclosed herein and may be implemented to achieve the benefits as described herein. Additional features and aspects of the disclosed system, devices, and methods will become apparent to those of ordinary skill in the art upon reading and understanding the following detailed description of the example implementations. As will be appreciated by the skilled artisan, further implementations are possible without departing from the scope and spirit of what is disclosed herein. Accordingly, the descriptions provided herein are to be regarded as illustrative and not restrictive in nature.

BRIEF DESCRIPTION OF THE DRAWINGS

The accompanying drawings, which are incorporated into and form a part of the specification, schematically illustrate one or more example implementations of the disclosed technology and together with the general description given above and detailed description given below, serve to explain the principles of the disclosed subject matter, and wherein.

DETAILED DESCRIPTION

Figure 1:
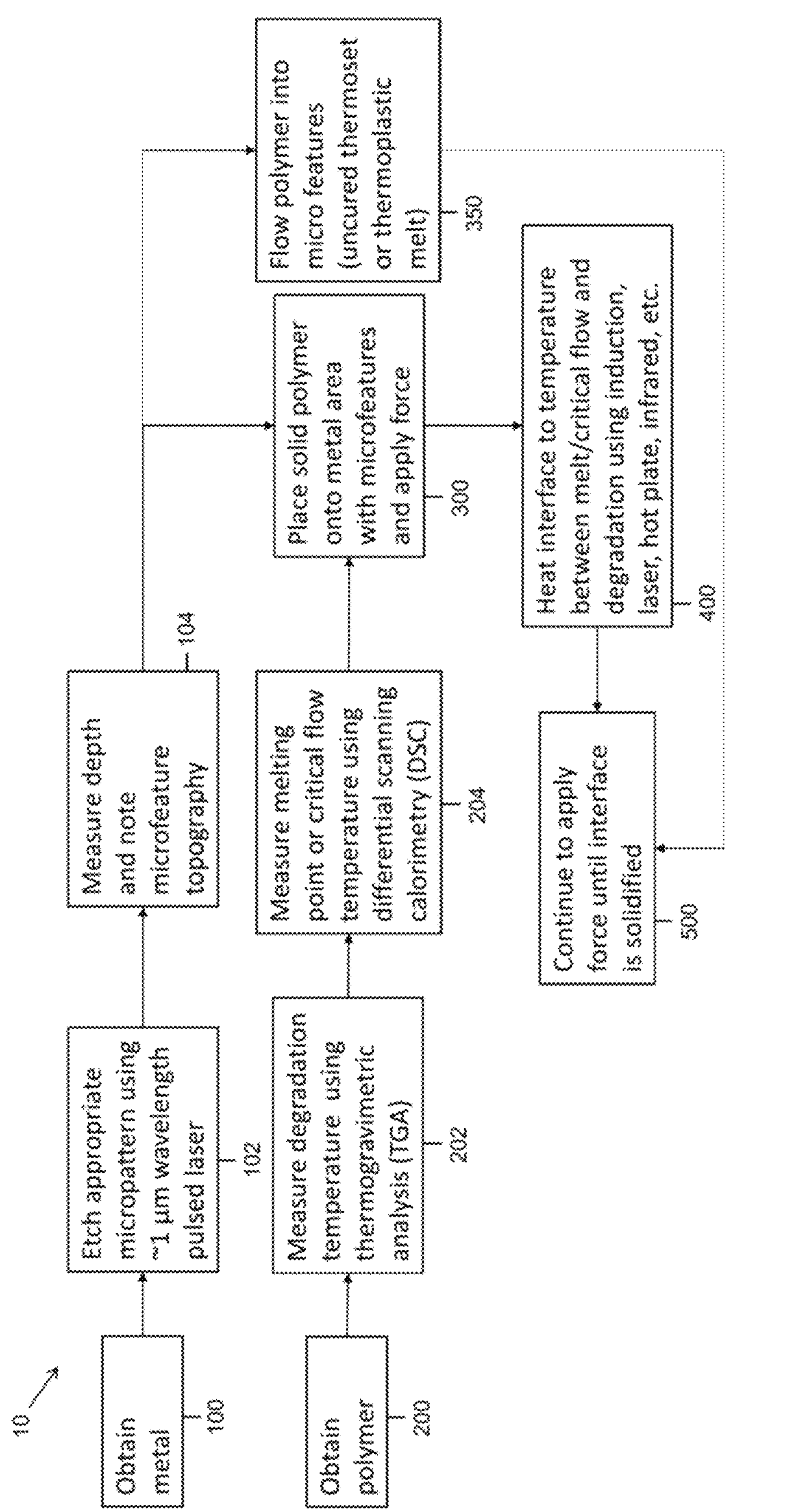
FIG. 1 is a flow chart depicting an example implementation of the disclosed method for joining polymer directly to metal without the use of adhesives or fasteners.

Example implementations are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the disclosed technology. Accordingly, the following implementations are set forth without any loss of generality to, and without imposing limitations upon, the claimed subject matter.

The examples discussed herein are examples only and are provided to assist in the explanation of the apparatuses, devices, systems, and methods described herein. None of the features or components shown in the drawings or discussed below should be taken as required for any specific implementation of any of these the apparatuses, devices, systems or methods unless specifically designated as such. For ease of reading and clarity, certain components, modules, or methods may be described solely in connection with a specific Figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

The disclosed technology provides a system and method for joining thermoplastic or thermoset polymers to metals and other materials without the use of traditional adhesives or fasteners. In an example embodiment, a first aspect of this technology involves functionalizing the surface of a metal part or component by etching a predetermined micropattern having specific microfeatures into the surface of the part or component. This etching is typically accomplished using a laser to create microscale valleys in the surface of the metal. When aluminum, for example, is used for the metal, the melt from the valleys is pushed up the edge of each valley, thereby creating a protrusion with ends that overhang the valley. When stainless steel, for example, is used for the metal, the melt travels slightly less up the sides of the valley, but still creates the desired microfeatures. For both of these metals, and potentially other metals, this process creates a surface that is clean and that includes a mechanically functional topography. Optimization of laser power, pulse width, velocity, number of passes, and geometry creates strong joints between metals and polymers using this method. For example, regarding geometry, a crosshatch pattern confers high joint strength; however, for achieving hermeticity, an etched pattern having parallel lines, perpendicular to any pressure gradient that may be present is preferred so that no leak path occurs. A 100W 1064 nm pulsed fiber laser (Laser Marking Technologies) or similar apparatus is suitable for the described laser etching. In alternate implementations, functionalization of the metal (or other material surface) may be accomplished using known chemical methodologies.

In an example embodiment, a second aspect of this technology involves melting a polymer part or component into the functionalized metal surface created by the disclosed etching process. This aspect utilizes both compressive force and heat, which encourages flow of the polymer into the microfeatures. Melting the polymer component may be accomplished using transmission laser heating, wherein a 1 μm continuous laser is directed through the polymer to the metal surface. Direct laser heating may also be utilized. An alternate approach utilizes an induction coil to heat the metal and thus also the polymer at the interface. Both methods employ compression to encourage the viscous melt to fill the metallic microfeatures. Other heating methodologies may be utilized. These methodologies include direct thermal conduction using a hot plate or similar device and resistive, spin, vibration, and ultrasonic heating, FIG. 1 is a flow chart depicting example implementations of the disclosed method for joining polymer directly to metal without the use of adhesives or fasteners. Example method 10 includes selecting or obtaining a metal at step 100; etching an appropriate micropattern on the metal using a ~1 μm wavelength pulsed laser at step 102; measuring depth and noting microfeature topography at step 104; selecting or obtaining a polymer at step 200; measuring polymer degradation temperature using thermogravimetric analysis (TGA) at step 202; measuring a melting point or critical flow temperature using differential scanning calorimetry (DSC) at step 204 (or measuring a curing temperature (for uncured thermoset or thermoplastic polymers, as described below); placing the polymer onto the metal area having the microfeatures and applying compressive force at step 300; heating the polymer/metal interface to a temperature between melt/critical flow and degradation using induction, laser, infrared, or hot plate heating methods at step 400; and continuing to apply compressive force until the interface is cooled at step 500.

With reference again to FIG. 1, an alternate implementation includes the use of a thermoplastic polymer, which is initially heated to a temperature at which it flows as a viscous melt (while remaining below the degradation temperature of the polymer); flowing the heated polymer onto the microfeatures (see step 350 of FIG. 1); and applying compressive force to the polymer-metal combination until the interface between the polymer and the metal has solidified and the materials have been joined. The method may be accomplished as an insert injection molding operation.

Still another alternate implementation includes the use of an uncured thermoset polymer; flowing the polymer onto the microfeatures (see step 350 of FIG. 1); using gravity or the addition of compressive force to fill the microfeatures with the polymer; and waiting until thermoset solidification has occurred before moving the joined part.

Figure 2A:
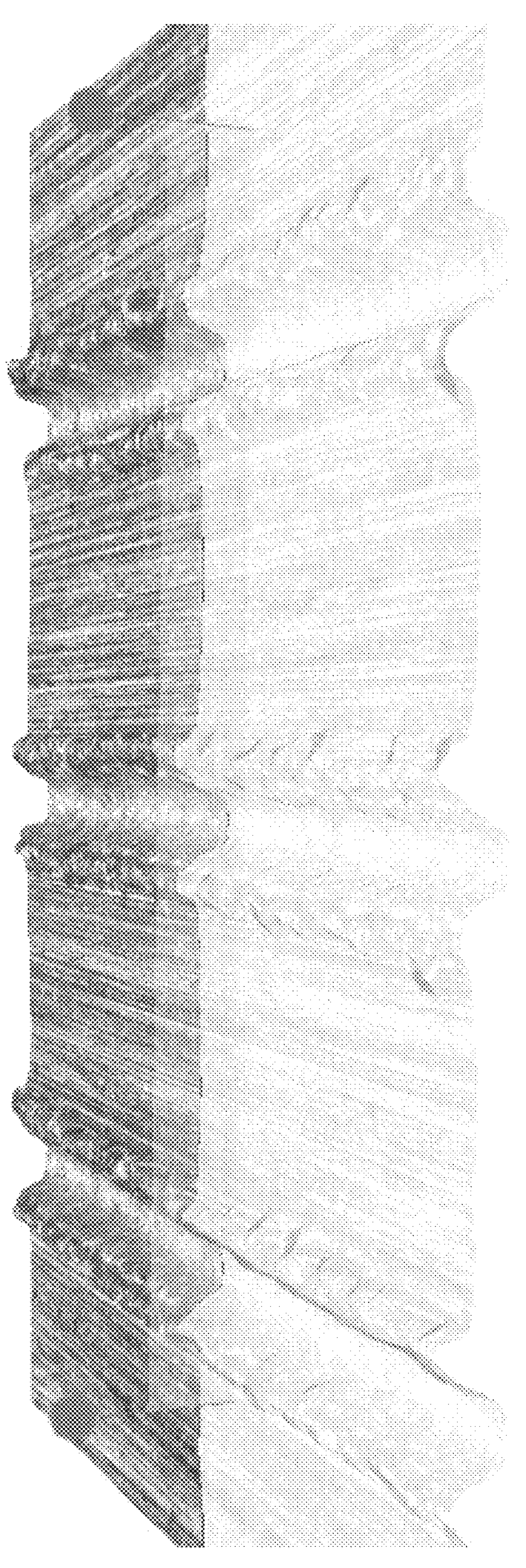
FIG. 2A is an image created from reconstructed three-dimensional data obtained using a non-contact three-dimensional profilometer of an aluminum plate etched with two passes of a laser to create a micropattern on the plate, wherein the micropattern includes various microfeatures.
Figure 2B:
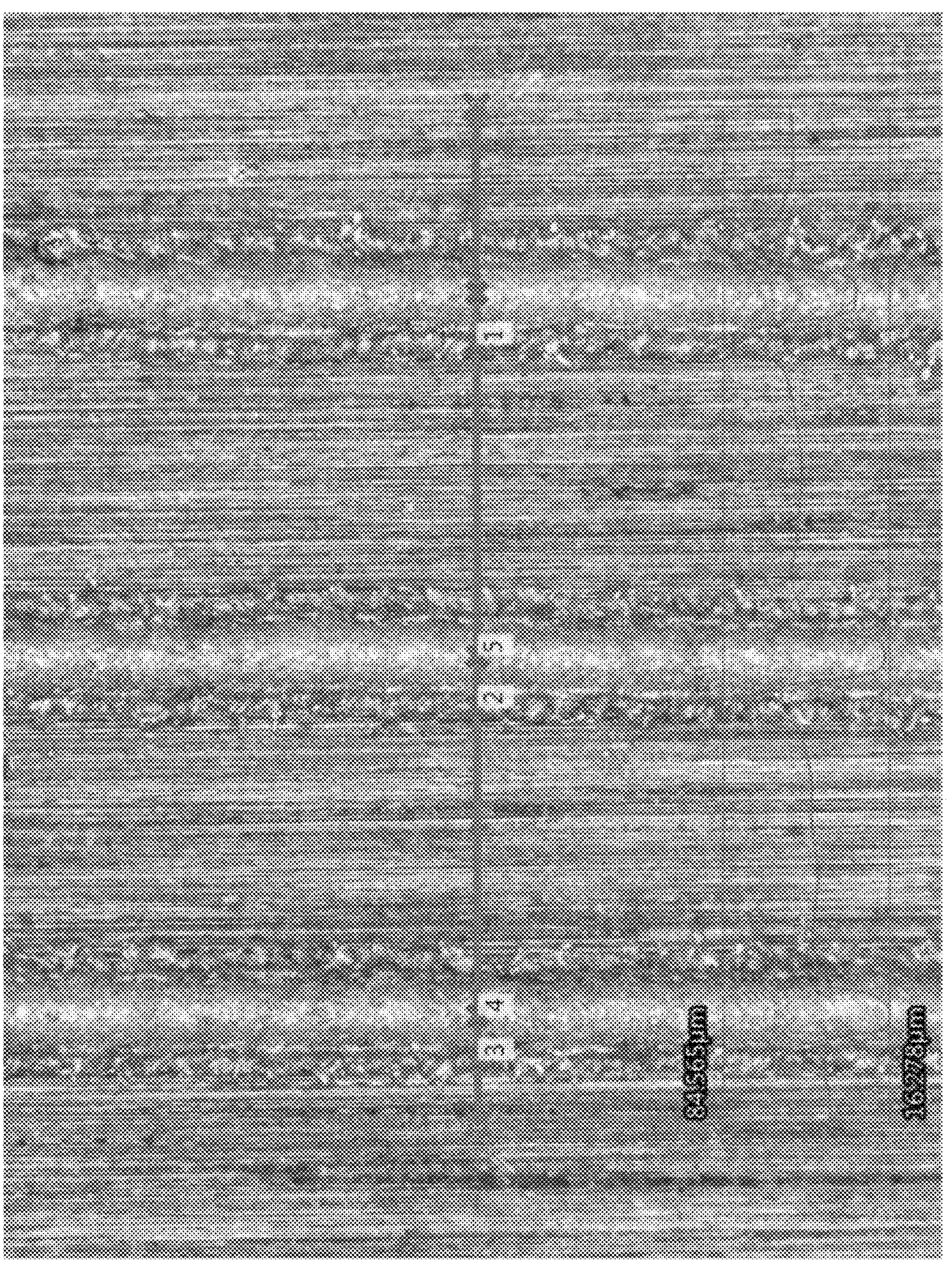
FIG. 2B is a micrograph of an aluminum plate etched with two passes of a laser to create a micropattern on the plate, wherein the micropattern includes various microfeatures.
Figure 2C:
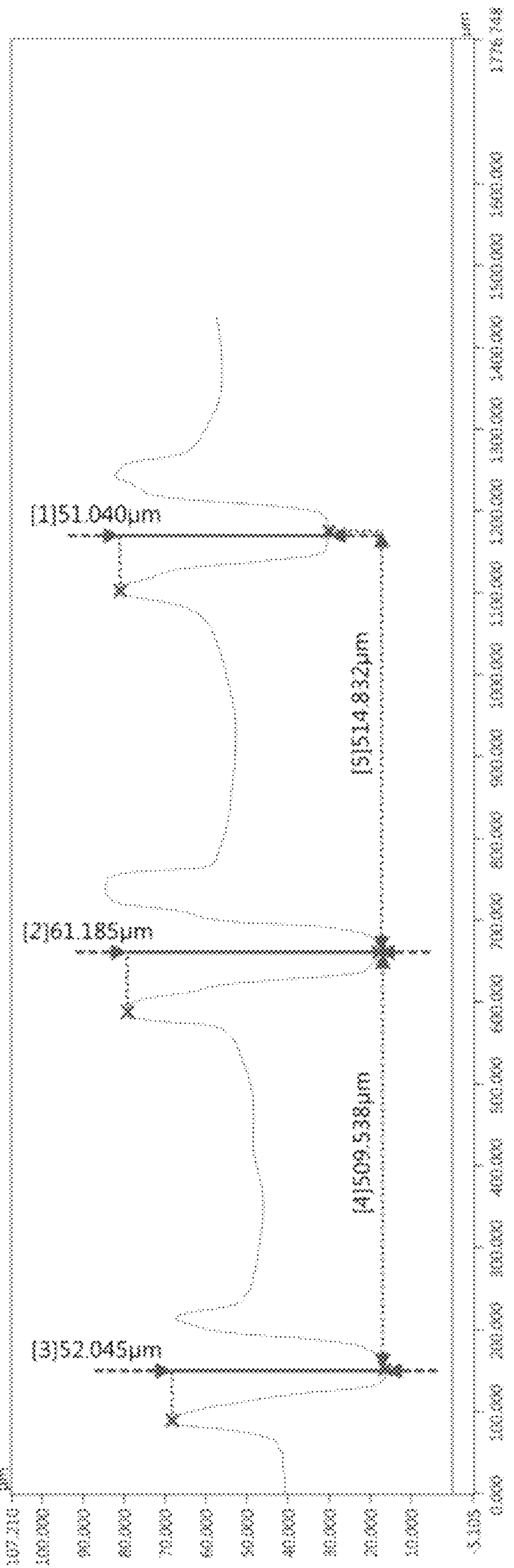
FIG. 2C is a graph depicting the physical properties of the various microfeatures including the height of the original material surface, the bottom of the laser path, distance between the laser paths, and the height of material protrusion above the surface of the plate.
Figure 2D:
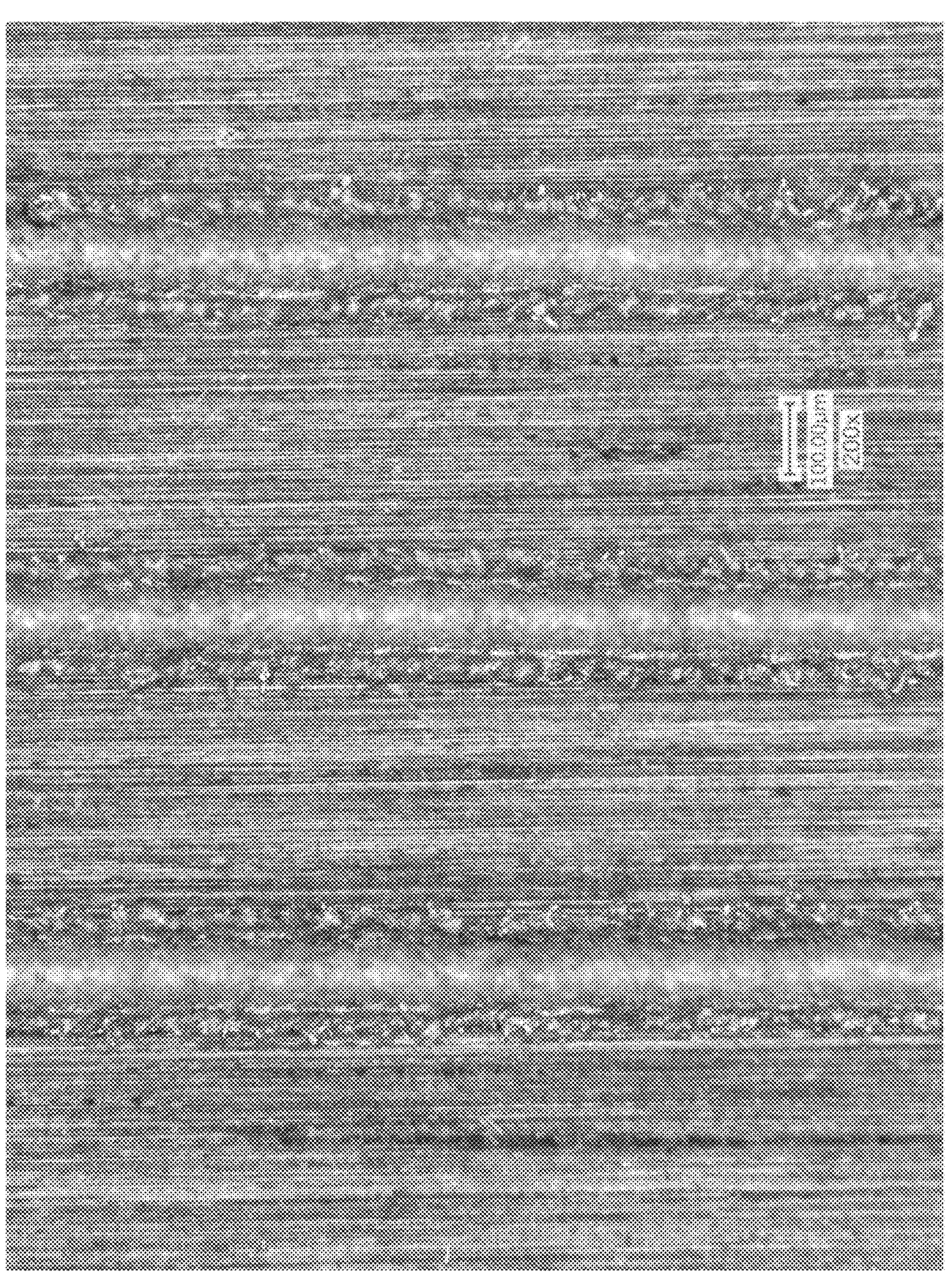
FIG. 2D is a micrograph of the aluminum plate of FIG. 2A depicting the protruding microfeatures.
Figure 3A:
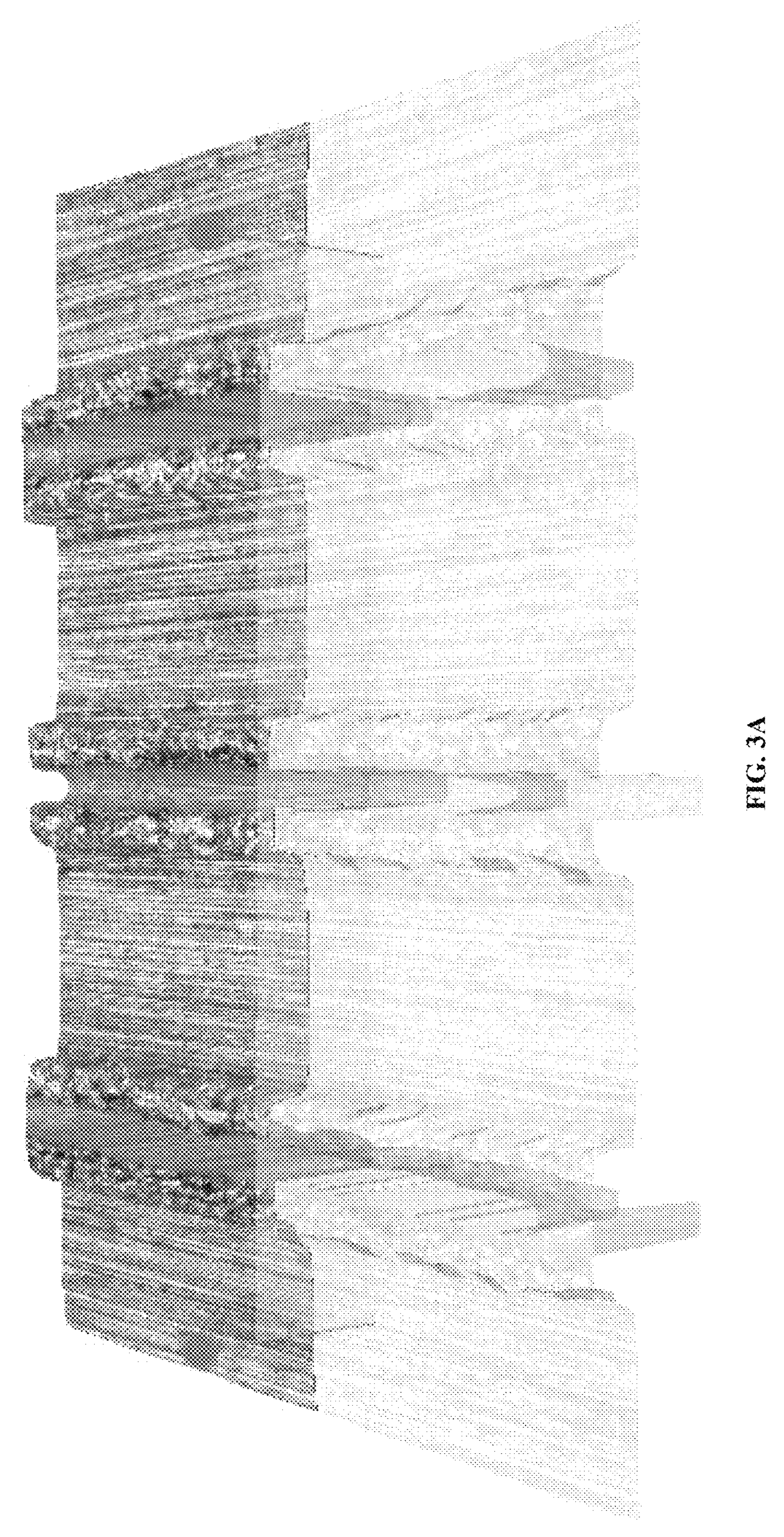
FIG. 3A is an image created from reconstructed three-dimensional data obtained using a non-contact three-dimensional profilometer of an aluminum plate etched with five passes of a laser to create a micropattern on the plate, wherein the micropattern includes various microfeatures.
Figure 3B:
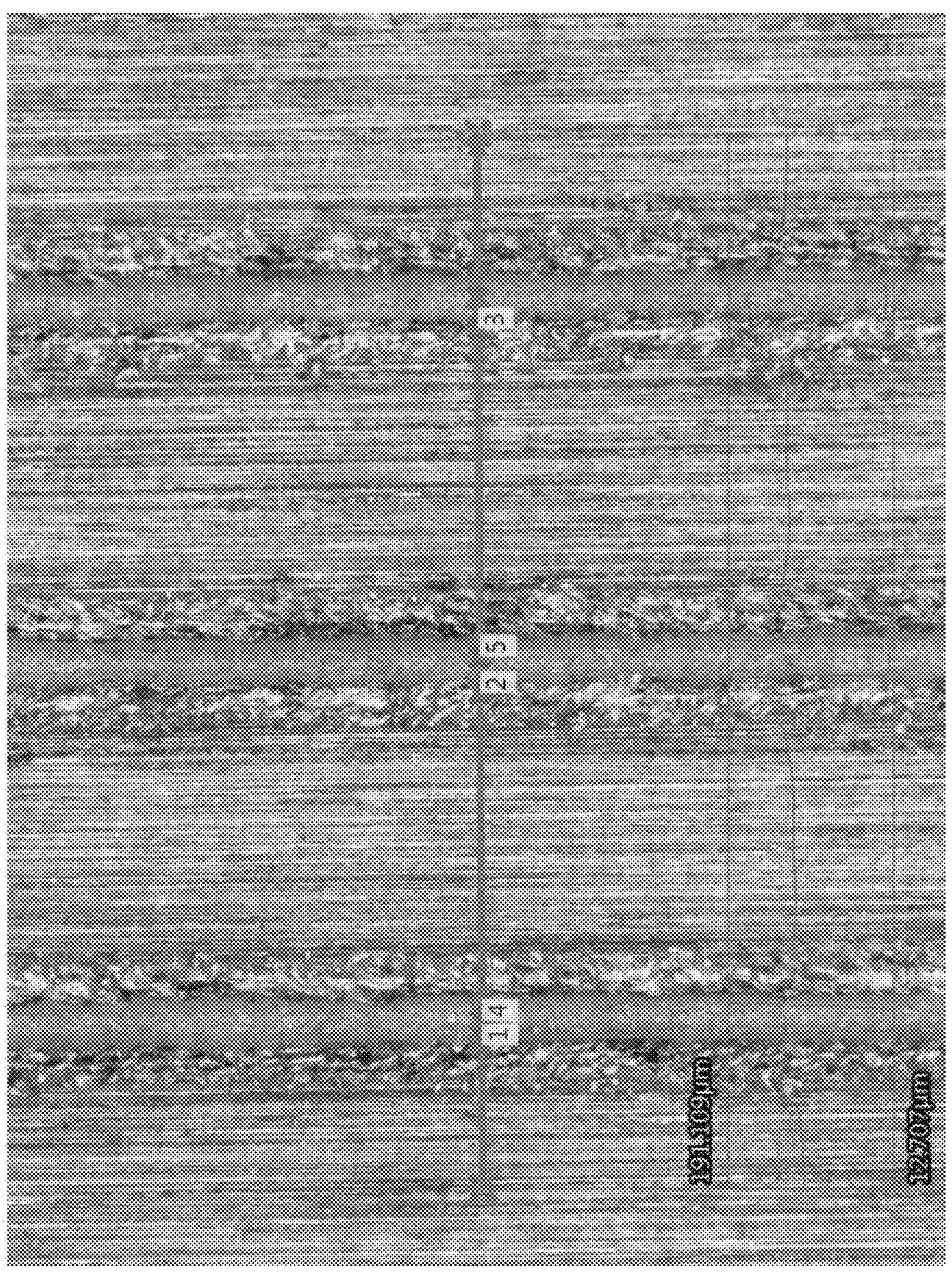
FIG. 3B is a micrograph of an aluminum plate etched with five passes of a laser to create a micropattern on the plate, wherein the micropattern includes various microfeatures.
Figure 3C:
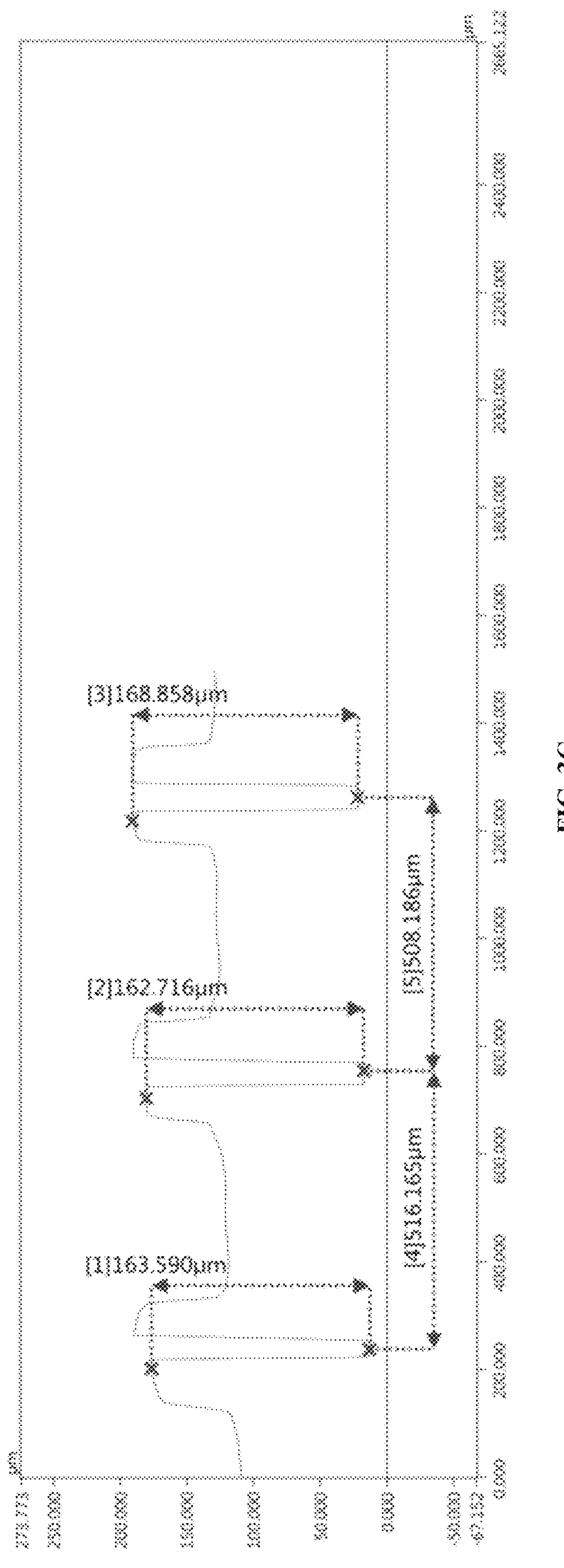
FIG. 3C is a graph depicting the physical properties of the various microfeatures including the height of the original material surface, the bottom of the laser path, distance between the laser paths, and the height of material protrusion above the surface of the plate.
Figure 3D:
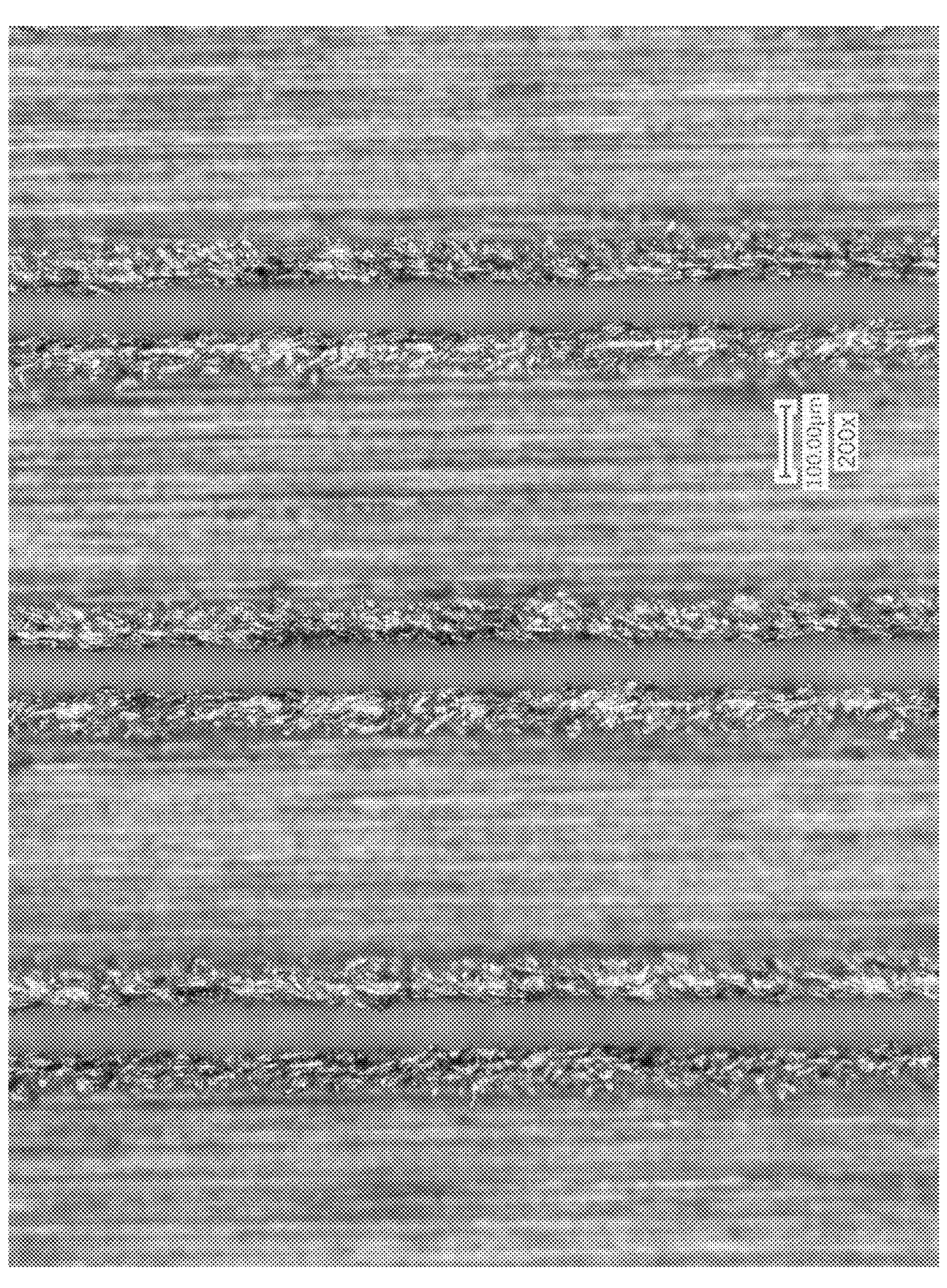
FIG. 3D is a micrograph of the aluminum plate of FIG. 3A depicting the protruding microfeatures.
Figure 4B:
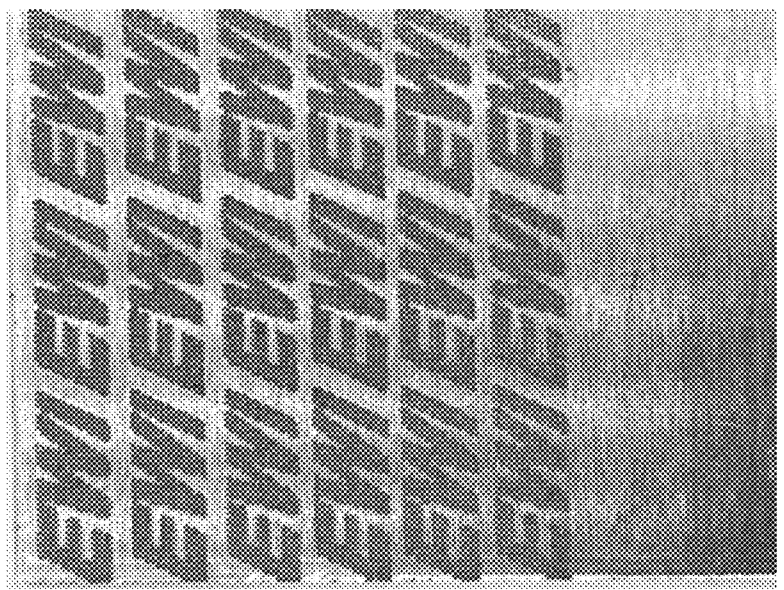
FIG. 4B is a is a close-up of the recurring micropatterns depicted in FIG. 4A.
Figure 4A:
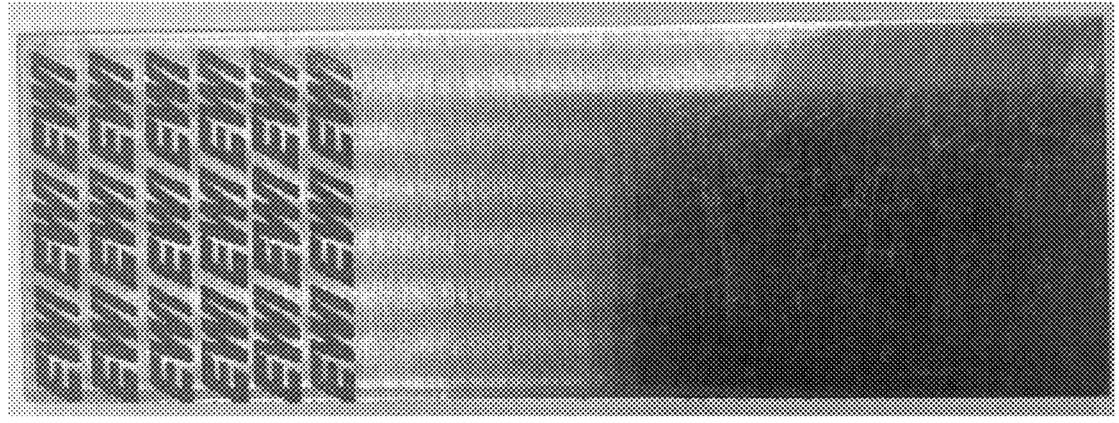
FIG. 4A is a photograph of an aluminum plate etched with a laser to create recurring micropatterns on the plate.
Figure 5B:
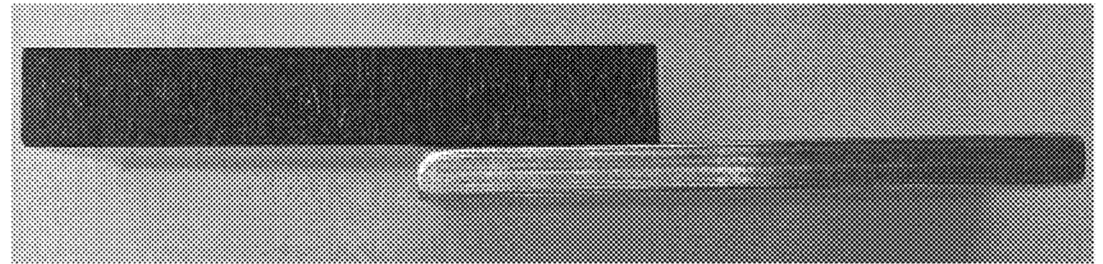
FIG. 5B is a photographic side view of a piece of polymer joined to the recurring micropatterns depicted in FIG. 4B using the disclosed system and method.
Figure 5A:
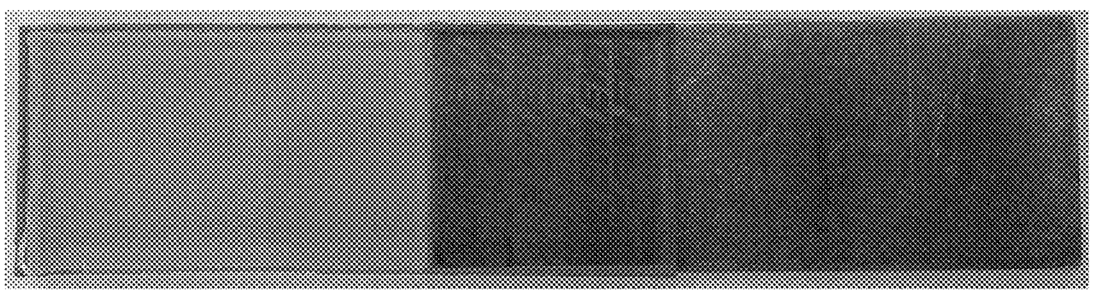
FIG. 5A is a photographic top view of a piece of polymer joined to the recurring micropatterns depicted in FIG. 4B using the disclosed system and method.

FIG. 2A is an image created from reconstructed three-dimensional data obtained using a non-contact three-dimensional profilometer of an aluminum plate etched with two passes of a laser to create a micropattern on the plate, wherein the micropattern includes various microfeatures; FIG. 2B provides micrograph of an aluminum plate etched with two passes of a laser to create a micropattern on the plate, wherein the micropattern includes various microfeatures; and FIG. 2C provides a graph depicting the physical properties of the various microfeatures including the height of the original material surface, the bottom of the laser path (e.g., depth of about 20 μm), distance between the laser paths (e.g., 0.5 mm), and the height of material protrusion above the surface of the plate (e.g., about 20-30 μm). FIG. 2D is a micrograph of the aluminum plate of FIG. 2A depicting the protruding microfeatures. FIG. 3A is an image created from reconstructed three-dimensional data obtained using a non-contact three-dimensional profilometer of an aluminum plate etched with five passes of a laser to create a micropattern on the plate, wherein the micropattern includes various microfeatures; FIG. 3B provides a micrograph of an aluminum plate etched with five passes of a laser to create a micropattern on the plate, wherein the micropattern includes various microfeatures; and FIG. 3C is a graph depicting the physical properties of the various microfeatures including the height of the original material surface, the bottom of the laser path (e.g., depth of about 100 μm), distance between the laser paths (e.g., 0.5 mm), and the height of material protrusion above the surface of the plate (e.g., about 40-60 μm). FIG. 3D is a micrograph of the aluminum plate of FIG. 3A depicting the protruding microfeatures. FIG. 4A is a photograph of an aluminum plate etched with a laser to create recurring micropatterns on the plate; and FIG. 4B is a close-up of the recurring micropatterns depicted in FIG. 4A. FIG. 5A is a photographic top view of a piece of polymer joined to the recurring micropatterns depicted in FIG. 4B using the disclosed system and method; and FIG. 5B is a photographic side view of a piece of polymer joined to the recurring micropatterns depicted in FIG. 4B using the disclosed system and method.

Aluminum (Aluminum 5052) test samples having a 25 mm×25 mm functionalized area were prepared using the disclosed laser ablation methodology. A cross-hatch pattern having 0.5 mm spacing was created using three (3) passes of a 100 W pulsed fiber laser (1064 wavelength) laser etching/marking system (Laser Marking Technologies Cobalt XL-EV). Treatment time for shear samples was 9 seconds and treatment time for hermetically sealed samples was 33 seconds. System parameters included power at 100%; a frequency of 100 KHz; a pulse width of 150 ns; and a velocity or speed of 1016 mm/second. The aluminum test samples were inductively welded to polyvinyl chloride (PVC) as described and demonstrated shear strengths greater than 1000 psi. The samples were leak-free (hermetically sealed) when tested using an air pressure decay method. When cycled from 0° C. to 65° C., the samples exhibited no difference in mechanical strength despite the difference in coefficient of thermal expansion between the joined materials.

The disclosed method can be used for the creation of components and parts having more complex geometries, such as cylindrical pipe geometries. With regard to this example geometry, laser etching may include a thin flat aluminum component etched on both sides that is placed on the inner diameter of a cylindrical pipe. Joining would include sliding a polymer fitting onto the end of the pipe and using an induction crimping tool to apply heat and force to create polymer melt flow into laser-created microfeatures. An example cycle time for this method is 30 seconds. Numerous other implementations and applications of the disclosed method are possible.

All literature and similar material cited in this application, including, but not limited to, patents, patent applications, articles, books, treatises, and web pages, regardless of the format of such literature and similar materials, are expressly incorporated by reference in their entirety. Should one or more of the incorporated references and similar materials differ from or contradict this application, including but not limited to defined terms, term usage, described techniques, or the like, this application controls.

As previously stated and as used herein, the singular forms "a," "an," and "the," refer to both the singular as well as plural, unless the context clearly indicates otherwise. The term "comprising" as used herein is synonymous with "including," "containing," or "characterized by," and is inclusive or open-ended and does not exclude additional, unrecited elements or method steps. Although many methods and materials similar or equivalent to those described herein can be used, particular suitable methods and materials are described herein. Unless context indicates otherwise, the recitations of numerical ranges by endpoints include all numbers subsumed within that range. Furthermore, references to "one implementation" are not intended to be interpreted as excluding the existence of additional implementations that also incorporate the recited features. Moreover, unless explicitly stated to the contrary, implementations "comprising" or "having" an element or a plurality of elements having a particular property may include additional elements whether or not they have that property.

The terms "substantially" and "about", if or when used throughout this specification describe and account for small fluctuations, such as due to variations in processing. For example, these terms can refer to less than or equal to +5%, such as less than or equal to +2%, such as less than or equal to +1%, such as less than or equal to +0.5%, such as less than or equal to +0.2%, such as less than or equal to +0.1%, such as less than or equal to +0.05%, and/or 0%.

Underlined and/or italicized headings and subheadings are used for convenience only, do not limit the disclosed subject matter, and are not referred to in connection with the interpretation of the description of the disclosed subject matter. All structural and functional equivalents to the elements of the various implementations described throughout this disclosure that are known or later come to be known to those of ordinary skill in the art are expressly incorporated herein by reference and intended to be encompassed by the disclosed subject matter. Moreover, nothing disclosed herein is intended to be dedicated to the public regardless of whether such disclosure is explicitly recited in the above description.

There may be many alternate ways to implement the disclosed technology. Various functions and elements described herein may be partitioned differently from those shown without departing from the scope of the disclosed technology. Generic principles defined herein may be applied to other implementations. Different numbers of a given module or unit may be employed, a different type or types of a given module or unit may be employed, a given module or unit may be added, or a given module or unit may be omitted.

Regarding this disclosure, the term "a plurality of" refers to two or more than two. Unless otherwise clearly defined, orientation or positional relations indicated by terms such as "upper" and "lower" are based on the orientation or positional relations as shown in the Figures, only for facilitating description of the disclosed technology and simplifying the description, rather than indicating or implying that the referred devices or elements must be in a particular orientation or constructed or operated in the particular orientation, and therefore they should not be construed as limiting the disclosed technology. The terms "connected", "mounted", "fixed", etc. should be understood in a broad sense. For example, "connected" may be a fixed connection, a detachable connection, or an integral connection, a direct connection, or an indirect connection through an intermediate medium. For one of ordinary skill in the art, the specific meaning of the above terms in the disclosed technology may be understood according to specific circumstances.

It should be appreciated that all combinations of the foregoing concepts and additional concepts discussed in greater detail herein (provided such concepts are not mutually inconsistent) are contemplated as being part of the disclosed technology. In particular, all combinations of claimed subject matter appearing at the end of this disclosure are contemplated as being part of the technology disclosed herein. While the disclosed technology has been illustrated by the description of example implementations, and while the example implementations have been described in certain detail, there is no intention to restrict or in any way limit the scope of the appended claims to such detail. Additional advantages and modifications will readily appear to those skilled in the art. Therefore, the disclosed technology in its broader aspects is not limited to any of the specific details, representative devices and methods, and/or illustrative examples shown and described. Accordingly, departures may be made from such details without departing from the spirit or scope of the general inventive concept.

What is claimed:

1. A method for joining dissimilar materials, comprising:

(a) etching a predetermined micropattern into a surface of a first material, wherein the first material is a metal used for creating a part, and wherein the micropattern includes various microfeatures;

(b) characterizing the physical properties of the microfeatures;

(c) characterizing a second material, wherein the second material is a polymer used for creating a part, and wherein the characterization of the second material includes:

(i) measuring a degradation temperature of the polymer; and (ii) measuring a melting point/critical flow temperature of the polymer;

(d) placing the polymer on the microfeatures formed on the metal surface to form an interface between the polymer and the metal and to form a polymer-metal combination;

(e) applying a predetermined amount of compressive force to the polymer-metal combination;

(f) for a predetermined period of time, heating the interface to a temperature falling between the degradation temperature of the polymer and the melting point/critical flow temperature of the polymer;

(g) discontinuing heating the interface; and (h) continuing to apply the compressive force to the polymer-metal combination until the interface between the polymer and the metal has solidified and the materials have been joined.

2. The method of claim 1, further comprising using a 100 W 1064 nm wavelength pulsed fiber laser to etch the predetermined micropattern into the surface of the first material.

3. The method of claim 1, wherein the predetermined micropattern includes a crosshatch pattern, a herringbone pattern, a pattern of squares, a pattern of concentric squares, a pattern of circles, or a pattern of concentric circles.

4. The method of claim 1, further comprising achieving a hermetic seal between the metal and the polymer by including parallel lines in the predetermined micropattern that are oriented perpendicular to any pressure gradient present in the part.

5. The method of claim 1, further comprising using thermogravimetric analysis to measure the degradation temperature of the polymer and using differential scanning calorimetry to measure the melting point/critical flow temperature of the polymer.

6. The method of claim 1, further comprising using infrared heating to heat the interface between the polymer and the metal.

7. The method of claim 1, further comprising using either direct laser heating or transmission laser heating to heat the interface between the polymer and the metal, wherein using transmission laser heating further includes shining a 1 μm wavelength continuous laser through the polymer to heat the metal surface at the interface between the polymer and the metal.

8. The method of claim 1, further comprising using an induction coil to heat the interface between the polymer and the metal; or using direct thermal conduction; or using resistive, spin, vibration, or ultrasonic heating.

9. A method of joining dissimilar materials, comprising:

(a) laser etching a predetermined micropattern into a surface of a first material, wherein the first material is a metal used for creating a part, and wherein the micropattern includes various microfeatures;

(b) characterizing the physical properties of the microfeatures;

(c) characterizing a second material, wherein the second material is a solid polymer used for creating a part, and wherein the characterization of the second material includes:

(i) measuring a degradation temperature of the polymer; and (ii) measuring a melting point/critical flow temperature of the polymer;

(d) placing the polymer on the microfeatures formed on the metal surface to form an interface between the polymer and the metal and to form a polymer-metal combination;

(e) applying a predetermined amount of compressive force to the polymer-metal combination;

(f) for a predetermined period of time, heating the interface to a temperature falling between the degradation temperature of the polymer and the melting point/critical flow temperature of the polymer;

(g) discontinuing heating the interface;

(h) continuing to apply the compressive force to the polymer-metal combination until the interface between the polymer and the metal has solidified and the materials have been joined; and (i) discontinuing application of the compressive force.

10. The method of claim 9, further comprising using a 100 W 1064 nm wavelength pulsed fiber laser to etch the predetermined micropattern into the surface of the first material.

11. The method of claim 9, wherein the predetermined micropattern includes a crosshatch pattern, a herringbone pattern, a pattern of squares, a pattern of concentric squares, a pattern of circles, or a pattern of concentric circles; or parallel lines oriented perpendicular to any pressure gradient present in the part for achieving a hermetic seal between the metal and the polymer.

12. The method of claim 9, further comprising using thermogravimetric analysis to measure the degradation temperature of the polymer and using differential scanning calorimetry to measure the melting point/critical flow temperature of the polymer.

13. The method of claim 9, further comprising using either infrared heating or an induction coil to heat the interface between the polymer and the metal; or using direct thermal conduction; or using resistive, spin, vibration, or ultrasonic heating.

14. The method of claim 9, further comprising using either direct laser heating or transmission laser heating to heat the interface between the polymer and the metal, wherein using transmission laser heating further includes shining a 1 μm wavelength continuous laser through the polymer to heat the metal surface at the interface between the polymer and the metal.

15. A method for joining dissimilar materials, comprising:

(a) laser etching a predetermined micropattern into a surface of a first material, wherein the first material is a metal used for creating a part, and wherein the micropattern includes various microfeatures;

(b) characterizing the physical properties of the microfeatures;

(c) characterizing a second material, wherein the second material is a solid polymer used for creating a part, and wherein the characterization of the second material includes:

(i) measuring a degradation temperature of the polymer using thermogravimetric analysis; and (ii) measuring a melting point/critical flow temperature of the polymer using differential scanning calorimetry;

(d) placing the polymer on the microfeatures formed on the metal surface to form an interface between the polymer and the metal and to form a polymer-metal combination;

(e) applying a predetermined amount of compressive force to the polymer-metal combination;

(f) for a predetermined period of time, heating the interface to a temperature falling between the degradation temperature of the polymer and the melting point/critical flow temperature of the polymer;

(g) discontinuing heating the interface;

(h) continuing to apply the compressive force to the polymer-metal combination until the interface between the polymer and the metal has solidified and the materials have been joined; and (i) discontinuing application of the compressive force.

16. The method of claim 15, wherein the predetermined micropattern includes either a crosshatch pattern, a herringbone pattern, a pattern of squares, a pattern of concentric squares, a pattern of circles, or a pattern of concentric circles; or parallel lines oriented perpendicular to any pressure gradient present in the part for achieving a hermetic seal between the metal and the polymer.

17. The method of claim 15, further comprising using infrared heating, an induction coil, direct laser heating, or transmission laser heating to heat the interface between the polymer and the metal; or using direct thermal conduction; or using resistive, spin, vibration, or ultrasonic heating.

18. A method for joining dissimilar materials, comprising:

(a) etching a predetermined micropattern into a surface of a first material, wherein the first material is a metal used for creating a part, and wherein the micropattern includes various microfeatures;

(b) characterizing the physical properties of the microfeatures;

(c) characterizing a second material, wherein the second material is an uncured thermoset polymer or viscous thermoplastic polymer used for creating a part, and wherein the characterization of the second material includes:

(i) measuring a degradation temperature of the polymer; and (ii) measuring a curing temperature of the polymer;

(d) flowing the polymer into the microfeatures to form a polymer-metal combination; and (e) applying a gravitational or compressive force to the polymer-metal combination until an interface between the polymer and the metal has solidified and the materials have been joined.

19. The method of claim 18, wherein the predetermined micropattern includes a crosshatch pattern, a herringbone pattern, a pattern of squares, a pattern of concentric squares, a pattern of circles, or a pattern of concentric circles.

20. The method of claim 18, further comprising achieving a hermetic seal between the metal and the polymer by including parallel lines in the predetermined micropattern that are oriented perpendicular to any pressure gradient present in the part.

* * * * *